US008521698B2

(12) United States Patent
Solimano et al.

(10) Patent No.: US 8,521,698 B2
(45) Date of Patent: Aug. 27, 2013

(54) METHOD FOR SAFEGUARDING THE INTEGRITY OF A RELATIONAL DATABASE IN CASE OF STRUCTURAL TRANSACTION EXECUTION

(75) Inventors: Marco Solimano, Genoa (IT); Giulia Piccioli, Genoa (IT)

(73) Assignee: Siemens Aktiengesellschaft, Munich (DE)

( * ) Notice: Subject to any disclaimer, the term of this patent is extended or adjusted under 35 U.S.C. 154(b) by 156 days.

(21) Appl. No.: 12/973,161

(22) Filed: Dec. 20, 2010

(65) Prior Publication Data
US 2011/0153574 A1   Jun. 23, 2011

(30) Foreign Application Priority Data
Dec. 18, 2009   (EP) ..................................... 09179963

(51) Int. Cl.
*G06F 7/00* (2006.01)
*G06F 17/00* (2006.01)

(52) U.S. Cl.
USPC .......................................... 707/687; 707/805

(58) Field of Classification Search
None
See application file for complete search history.

(56) References Cited

U.S. PATENT DOCUMENTS

| | | | |
|---|---|---|---|
| 5,119,465 A * | 6/1992 | Jack et al. ...................... | 717/137 |
| 5,226,117 A * | 7/1993 | Miklos ........................... | 715/853 |
| 5,315,709 A * | 5/1994 | Alston et al. ......................... | 1/1 |
| 6,216,136 B1 | 4/2001 | Ronstroem | |
| 6,366,917 B1 * | 4/2002 | St. John Herbert, III ............. | 1/1 |
| 6,865,583 B2 * | 3/2005 | Stockley ................................ | 1/1 |
| 7,178,129 B2 * | 2/2007 | Katz .............................. | 717/108 |
| 7,523,097 B1 * | 4/2009 | Wilson et al. .......................... | 1/1 |
| 7,779,404 B2 * | 8/2010 | Movassaghi et al. .......... | 717/171 |
| 2003/0074378 A1 * | 4/2003 | Midgley et al. ................ | 707/204 |
| 2005/0160104 A1 * | 7/2005 | Meera et al. ................... | 707/100 |
| 2005/0251523 A1 | 11/2005 | Rajamani et al. | |
| 2005/0257157 A1 * | 11/2005 | Gilboa et al. .................. | 715/747 |
| 2005/0262107 A1 * | 11/2005 | Bergstraesser et al. ........ | 707/100 |
| 2006/0122977 A1 | 6/2006 | Brodhun et al. | |
| 2006/0136471 A1 | 6/2006 | Ge et al. | |
| 2007/0255715 A1 * | 11/2007 | Li et al. ............................ | 707/10 |
| 2008/0092067 A1 * | 4/2008 | Anderson et al. .............. | 715/762 |
| 2009/0013011 A1 * | 1/2009 | Barker et al. ................... | 707/203 |
| 2009/0106247 A1 * | 4/2009 | Daughtry et al. ................. | 707/8 |
| 2009/0282062 A1 * | 11/2009 | Husic ............................. | 707/100 |
| 2010/0083129 A1 * | 4/2010 | Mishra et al. .................. | 715/744 |
| 2010/0088618 A1 * | 4/2010 | Mayer-Ullmann ............ | 715/763 |

(Continued)

FOREIGN PATENT DOCUMENTS

WO           9904351 A2      1/1999

OTHER PUBLICATIONS

Anonymous: "Introduction to GNU Emacs" Feb. 12, 2001, pp. 1-38, XP55016363, Retrieved from the Internet URL: http://www.utexas/edu/its/training/handouts/pdf/cctuv03.pdf.

*Primary Examiner* — Wilson Lee
*Assistant Examiner* — Jessica N Le
(74) *Attorney, Agent, or Firm* — Laurence A. Greenberg; Werner H. Stemer; Ralph E. Locher (57) ABSTRACT

A method enables an administration of resources (content) in web packages. By automatically adding a prefix to a resource name causing a name conflict, even resources having the same name can be handled when installing a new web package by a virtual file system mapping the resources to which a prefix has been added to the physical content required for the web application.

7 Claims, 7 Drawing Sheets

(56) References Cited

U.S. PATENT DOCUMENTS

| | | | |
|---|---|---|---|
| 2010/0223242 A1* | 9/2010 | Jones et al. | 707/704 |
| 2010/0251156 A1* | 9/2010 | Cantwell | 715/771 |
| 2010/0257457 A1* | 10/2010 | De Goes | 715/751 |
| 2010/0299376 A1* | 11/2010 | Batchu et al. | 707/955 |
| 2011/0145298 A1* | 6/2011 | Himmelsbach et al. | 707/802 |
| 2011/0252432 A1* | 10/2011 | Sim-Tang et al. | 719/318 |

* cited by examiner

FIG 7 editing a relationship

FIG 8 closing an Editing Session

FIG 9 error on saving an Unlocked session

FIG 10

FIG 11 suspended versions shown in CO Configurator

FIG 12 opening a suspended editing version

METHOD FOR SAFEGUARDING THE INTEGRITY OF A RELATIONAL DATABASE IN CASE OF STRUCTURAL TRANSACTION EXECUTION

CROSS-REFERENCE TO RELATED APPLICATION

This application claims the priority, under 35 U.S.C. §119, of European application EP 09179963, filed Dec. 18, 2009; the prior application is herewith incorporated by reference in its entirety.

BACKGROUND OF THE INVENTION

Field of the Invention

The present invention relates to a method for safeguarding the integrity of a relational database in case of a structural transaction execution in object relational mapping saving.

As it is well known, relational databases have been more and more chosen as a support for data storage in Manufacturing Execution Systems (MES). A method for modeling and scheduling manufacturing processes planned by an Enterprise Resource Planning (ERP) and produced by a shop floor, provides these Manufacturing Executing Systems (MES) for planning, scheduling and implementing the scheduled manufacturing processes and controlling the corresponding production steps at the shop floor.

In particular, the Enterprise Resource Planning (ERP) is a system including hardware devices and corresponding software applications for planning the business resources of an enterprise, i.e. material provisions, human resource management, purchasing, orders, profits, finance, inventory controls, customer management, etceteras, while the term "shop floor" has been used to indicate a system supporting the control of single machines involved in the manufacturing processes, for example by measuring the number of pieces produced per hour by each machine or the functioning parameters thereof, the quality of the pieces produced and so on.

MES is an intermediate layer providing computing machines and software tools between the ERP upper layer and the shop floor lower layer, including a software tool for production order management, which receives requests of production from the ERP, and a software tool for production modeling, which supports the phases of selecting and managing the resources to be involved in the manufacturing processes, i.e. employees, machines and materials, in order to realize a planned manufacturing process within required time constrains.

Therefore, manufacturing execution systems require modeling plant equipment for both scheduling and controlling activities. More particular, the manufacturing execution systems require reliable instruments to manage in complex production environments huge amounts of data coming from the shop or used to control the process at the shop floor level. Simultaneously, the software engineers operating the MES and/or the client need very often to amend the data structure in the relational database of the MES.

In a relational database, the values of specific data variables and the structures among those variables as well as their relationship are organized according to a logic structure rather configured by the software engineer of the MES than by the client using the MES at shop floor level. The variables in particular stem from the established software programs running within the MES and they are produced, updated and so on automatically. As to the structure of the data variable and their relationships, they are commonly the result of human analysis and typically they are inserted through a GUI directly by the operator.

In many cases, transaction concepts are introduced while inserting data. These concepts are strictly related to each other in order to avoid the production of inconsistencies due to incomplete insertion of data. Data to be saved in a relational database are inserted in a so-called "transaction". Usually, in case some errors might occur during the insertion of some data, the data contained in the transaction is not saved and the data on the relational database is restored in the version before the transaction was executed, thereby guaranteeing the integrity of the data but loosing the amendments.

In industrial applications covered by the MES, more and more it is emerging towards the usage of relational databases for saving the data coming from the production plant. In the latest years tools have been created that help customers in building their own MES applications. These tools are provided by independent vendors. These vendors and their respective customers have to deal with the way the data is stored in the relational database which provides a fixed defined structure or at least an extended structure according to the requirements of the particular application. This demand introduces the need to provide instruments to the customer to enable modifications of the structure of the relational database using the aforementioned tools to adapt the application to the customer's needs. Such modifications are performed either by program of the application itself, or, more commonly, via a configuration GUI. In more sophisticated applications, a transactional approach is preferred when modifying data structures in order to avoid incomplete structure modifications.

Since the users don't access the actual structure of the relational database when using the configuration GUI, such modifications can be considered as a part of the more general problem of having an abstract representation of the relational database in terms of objects and classes, and the phase of applying the structure modification as part of the problem of finding an efficient way to "translate" abstract object and classes representation to a physical structure, without requiring a user to have a deep understanding of such physical structure.

This problem has so far been solved either in the absence of a transactional approach or by allowing a set of modifications to be rejected due to inconsistencies in the structure of the relational database. In the first case, each modification is made individually and immediately applied. This means that is not possible to block the relational database for an arbitrarily long time. The advantage is that it is not possible to execute a set of structure modifications thereby avoiding the problem of only partially applied modifications with the implication of an in total inconsistent modification. Obviously, the method is cumbersome when many modifications in complex environments have to be executed.

In case the transactional approach is pursued, an editing session is feasible. Moreover, it is possible to make modifications while the relational database is in use and data contained therein is changed. Of course, it is not possible to enter more than one concurrent editing session at the same time. In general, this approach is far more flexible and suitable; additionally, since a transactional approach is followed, in case of some modifications that might not be acceptable (i.e. because data in the relational database has been changed in the meantime), the entire set of modification is refused, thereby avoiding to make incomplete modifications and to enter inconsistent structures.

Even if this approach is more fail-safe and more suitable than the first approach, there are still a couple of drawbacks which also render this approach not so applicable, they include:
1. In the case of a long editing session, the user risks to loose the work performed when the entire transaction of the editing session is refused. This drawback can lead to a serious problem because during engineering activities a loss of the most recent activities is contra-productive.
2. Additionally, embedding all engineering activities in just one transaction would risk having an arbitrarily long transaction on the relational database which is a highly discouraged way of acting on a relational database and can cause serious problems due to the lock of tables.
3. While an editing session is active, according to the transaction police applied, it can occur that read/write operations to data whose structure is currently under modification is denied. This denial disables the process of engineering at run-time when a user wants to receive an immediate feedback from a running application on the changes in structure he made.

SUMMARY OF THE INVENTION

It is therefore an objective of the present invention to provide a method for safeguarding the integrity of a relational database in the case of a structural transaction execution that facilitates a modification of data structures in a secure way without to confine the developer in terms of time for the structure modifications and the user in term of usability and accessibility of the relational database.

The objective is achieved according to the present invention by a method for safeguarding the integrity of a relational database in case of structural transaction execution in object relational mapping saving. The method includes the steps of:
a) creating an application for a structural database transaction to be executed, the application containing a set of data structure;
b) starting an editing session on the application, the editing session copying the data structure of the application and labeling the original version of the data structure as a current version used and labeling a copied version as an editing version;
c) editing any change to the data structure in the editing version of the data structure;
d) closing the editing session by either saving the editing version of the data structure to the database or discarding the editing version of the data structure or suspending the editing version of the data structure;
e1) wherein the saving of the editing version, installs the editing version of the data structure to the database thereby removing the original version of the data structure and removing the labeling of the former editing version;
e2) wherein the discarding of the editing version deletes the editing version and removes the labeling of the original version of the data structure; and
e3) wherein the suspending of the editing version stores the editing version temporarily, keeps the original version of the data structure and removes the labeling of the original version of the data structure.

This method enables a modification of the data structures in a secure way without confining the developer in terms of time for the structure modifications and the user in term of usability and accessibility of the relational database. At any time, when the user is not sure whether or not to replace the existing version of the data structure by the version as yielded in the editing session, this method allows to suspend the current editing session and to resume this session later without any loss of the modifications so far entered in the prior editing session or to reject the editing session completely. During the execution of the editing session, the concept of applications to run a structure modification allows to run more than one exclusive editing session when the applications are different from each other.

In order to improve the user's efficiency when establishing an editing session, an editing session may be executed either in a locked or unlocked mode. Wherein the locked mode does allow any read-action but does not allow any write-action on the application for which the editing session is open. The unlocked mode allows any read-action and write-action on the application for which the editing session is open.

In order to assist the engineering phase when editing, during an active editing session, any change is checked already when modifications are issued against data structure inconsistencies, such as uniqueness of data structure keys.

In order to limit the time required to update the database with an editing version, the engineering user shall have a give-way right to access the database without any disturbances caused by other users connected to the data structure of the present application under editing. Therefore, for the saving of the editing version to the database, any user connected to the data structure of the application is disconnected prior to the installation of the editing version to the database.

In order to guarantee the accessibility to the read/write option other users have when an editing session is in an unlocked mode by an engineering user, it is advantageously to provided in case of an editing session in the unlocked mode that changes made to the data structure of the application during the editing session are discarded in case of an inconsistency with the data structure of the current version.

Other features which are considered as characteristic for the invention are set forth in the appended claims.

Although the invention is illustrated and described herein as embodied in a method for safeguarding the integrity of a relational database in a case of structural transaction execution, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

For the description of the present invention, it has to be emphasized that Microsoft®.NET Framework is the basic software "backbone" for a manufacturing execution system.

Figure 1:
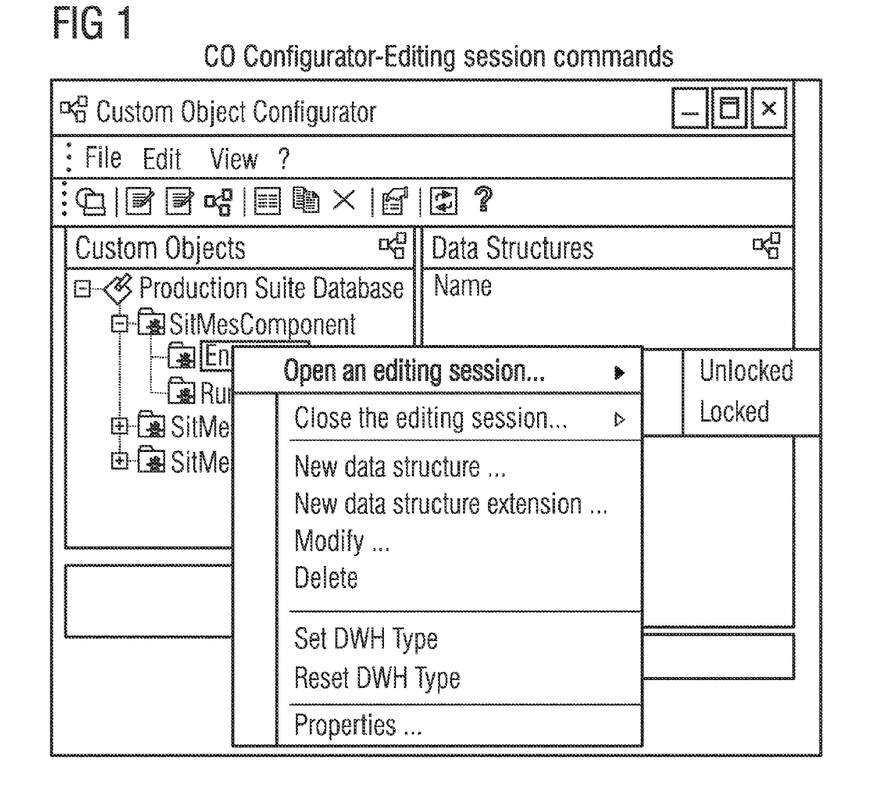
FIG. 1 is a screen-shot schematically showing a custom object configurator COC according to the invention.

FIG. 1 illustrates schematically a screen-shot of a Custom Object Configurator within a SIMATIC® IT when opening an editing session on a computer. To explain in short words the background of SIMATIC® IT, the ISA-95 standard has to be mentioned. ISA-95 is increasingly accepted as the world standard for Manufacturing Execution Systems that customers can rely upon. SIMATIC® IT not only covers ISA-95 functionalities but also actually uses ISA-95 as a blueprint for its product architecture. Siemens Aktiengesellschaft, the owner of SIMATIC® IT, is an active member of the ISA-95 committee to contribute to its continuing development.

SIMATIC® IT itself is a collection of software components representing Siemens' proposition for Manufacturing Execution Systems (MES). SIMATIC® IT uniqueness is represented by its entire architecture, designed using ISA-95 as an architectural blue print for the implementation. SIMATIC® IT Production Modeler enables the definition of the Plant Model and of all the Standard Operating Procedures (in terms of rules) in a fully graphical environment. SIMATIC® IT components physically execute the actions defined in these rules.

The general idea of the present invention is that of creating a "copy" of structures under modification within an editing session and identifying them explicitly (for example, through a label, like "EDITING"). The "old copy" of such structures will be labeled as well (for example, as "CURRENT"). In this way, the structure to be modified is duplicated. The manager of the relational database knows when structures must be duplicated by explicitly defining an "editing session". Additionally, the concept of application identifies which data structure must be modified (and therefore be copied). An application is a set of data structures. Since a data structure can belong to one unique application only, it is possible to have more than one editing session currently opened, provided they refer to different applications.

In this way, actions admissible for the user are those listed as now described.

The user can perform changes within the editing session and abort them without affecting in any way the connected clients. He can open an editing session while offer clients are connected to the same application (to the same data structure). He can perform changes to the structure that is at the same time being accessed by the client, for example, removing a property for which values are stored periodically. The user can close the editing session quitting the changes. It can then be checked that the client is still connected to the data structure and can continue storing its data without any disturbance; also the browsing methods return the structure prior to the changes to the client. The user can open more editing sessions on different applications and some of them, while discarding others, the user can:

a) Open an editing session for changing the data structure of application A;
b) Open an editing session for changing the data structure of application B;
c) Perform changes to the data structures of application A;
d) Perform changes to the data structures of application B;
e) Close editing session for application A, saving the changes; and
f) Close editing session for application B, discarding the changes.

The system stores all the changes done during an editing session (i.e. after an editing session has been opened) on a version, which is labeled as EDITING and is separated from the version, named as CURRENT, that is accessed by the clients for all browsing and runtime operations (with the obvious exclusion of any engineering operations done inside the editing session itself which are exclusively applied to structures labeled as EDITING).

The EDITING version's scope is limited to the editing session. This means that such structures are created when the editing session is opened and in general disappear when the session is closed. If the editing session is closed with a QUIT parameter, the EDITING version is directly removed; otherwise, if the session is closed with a SAVE parameter, its status is changed to CURRENT and the old current is removed. In case of a transaction rollback, the only effect is that the CURRENT version is preserved as well as the EDITING one which is still available for the user who can delete individual modifications and render the set consistent to be saved later as CURRENT. An additional status is labeled SUSPENDED. In this case, this status is purely logical (i.e. it is not explicitly labeled and does not imply an additional copy of structures). This status can be chosen when a user wants to close an editing session neither discarding the edited changes nor saving them as CURRENT (because the changes are still incomplete, for example). In this case when an editing session is closed without saving or quitting it, the configuration data stored in the EDITING session are left unchanged: they are not exported to become the CURRENT version like during SAVE operations, nor removed from the database in case of a QUIT operation.

As soon as a new editing session is opened for a given application, the system checks whether an EDITING version already exists. Since it is not allowed by the system to have more than one editing session for each application, the user is requested to choose between two options, either to reopen the suspended version in order to save it or to discard it. If the second option is chosen, the suspended EDITING version is overwritten with a new one from scratch and the changes done during the previous session are lost forever.

Finally, the present system and method allow to provide a suspended session even when this demand has not been based on an explicit user choice but due to problems that might occur during the engineering activities. For example, the configuration client where the user performs its engineering looses the connection to the data server. In such case, the modified structures still persist in a way like an editing session has been suspended. Of course, the editing session is closed since the client on which the session was opened appear to be closed.

This approach has the following stringent advantages:

1. Other clients accessing the data stored in the database will see the CURRENT version what avoids the presentation of incomplete modifications and, more general, always focuses on an access to data whose structures are stable.

2. The EDITING copy is saved on the database and thus permanently available until this copy is explicitly removed by an user action. This allows to recover this version without particular efforts in case of system crashes or any kind of severe data problems.
3. The transaction is applied once when the EDITING copy is made permanent (the CURRENT version is overwritten with the EDITING copy). At the occurrence of problems during this action, a roll back of the transaction would leave the CURRENT version untouched and the EDITING copy still saved.
4. The duration of a transaction is very limited and much more deterministic because the transaction required only the time required to copy limited set of tables into the database.

In summary, two main advantages of this new approach exist. It is possible to perform engineering activities while other applications access (both reading and writing) the data stored on the database in a controlled and secured way. The risk for engineers to see their work (possibly long and hardly repeatable) completely lost is highly reduced. These advantages ease engineering activities on complex relational databases, allowing an extended usage of concurrent engineering and testing, ultimately saving time when designing complex data structures to be made permanent, as usually happens in an industrial application.

The examples hereinafter described are drawn based on the already existing suite of component for MES application developing, called SIMATIC® IT. Particularly, this invention is to be applied to Custom Object Configurator (COC), a tool for enabling users to extend the database scheme of SIMATIC® IT data according to their individual needs. SIMATIC® IT Production Suite uses Microsoft® SQL Server as a backend for storing engineering and runtime data. These data are normally stored in one or more databases. SIMATIC® IT Production Suite databases cannot be managed by the user, and thus it is not possible for the user to alter the structure and configuration of each existing database table, whereas it is possible to define custom objects to store custom data. Custom objects CO are essentially a convenient abstraction allowing users to create and manage custom tables stored inside SIMATIC® IT Production Suite databases in order to support virtually complex data management requirements. Custom data structure holding CO are created and configured by the means of a graphical user interface having no direct access to SQL server. CO defined in the SIMATIC® IT Components database support relationships and referential integrity, and can be used to extend certain database tables of Production Order Manager and/or Material Manager.

The structure, properties and indexes of CO can be defined with the COC user interface or programmatically, via the COGSI interface as well. The present invention is applied when CO are modified through the user interface. The following description will explain how the following features are implemented.

The objective of SIMATIC® IT users that shall be fulfilled by the present invention is to enable the user to perform also long-lasting engineering sessions of the same custom structures that meanwhile are being used by other clients, connected to the same application for which the editing session has been opened, avoiding client access tables with structure different from the one they have in cache. This goal will be fulfilled by providing a separate environment for performing changes to the custom structures used in runtime (the CURRENT version). As a consequence of this change, it will be possible to allow clients to stay connected throughout the entire editing session and only force their disconnection and re-alignment to the new data structure when the changes are verified and become the mandatory version (i.e. only when the session is closed and the EDITING version becomes CURRENT).

In the following it is listed:
a) the actions that the engineer who wants to configure CO performs according to the desired changes (user action);
b) the corresponding effects issued by the system in response to user action (System reaction); and
c) the user interface (CO configuration tool namely) modifications to support this editing session (user interface).

User Action

A user can open on a PC (PC1) a CO Configurator (COC) and perform the following actions by means of the COC:
a) Open an editing session in shared (unlocked) mode for data structures according to a first application Y1;
b) Perform changes to the structures and relationships of application Y1;
c) Browse the EDITING version for application Y1;
d) Open an editing session in shared (unlocked) mode for data structures according to a second application Y2;
e) Perform changes to the structures and relationships of application Y2;
f) Browse the EDITING version for application Y2;
g) Browse structures and relationships of all the applications that are still in read-only mode;
h) Close the editing session for application Y2 with QUIT option; and
i) Close the editing session for application Y1 with SAVE option.

While the COC is opened on PC1, it is possible to open other instances of the COC on different PCs in the network and perform the following actions while one or more editing session are still opened on PC1:
j) Browse structures and relationships of all the applications that are still in read-only mode, including application Y1 and Y2 that are in write-mode because the editing sessions are still open;
k) Open an editing session for data structures of any other application different from the applications Y1 and Y2;
l) Perform changes to the structures and relationships inside the editing session for the last mentioned editing session;
m) Browse the EDITING version inside this editing session; and
n) Close the editing session with QUIT option or SAVE option.

System Reaction

The system reaction to the user action listed in the previous paragraph is now described. Please note that the numbering with letters provide the exact correspondence between the user action and the system reaction:
a) The EDITING version is created for application Y1 in the database where application Y1 is defined for, i.e. all the entities (data structure and relationships) belonging to application Y1 are duplicated in the database and labeled with VersionID1 (type EDITING);
b) The changes to the configuration of data structures in application Y1 are stored persistently in the database in the records corresponding to the EDITING version;
c) All the entities comprised within application Y1 with version set to EDITING version are browsed in the database;
d) The EDITING version is created for application Y2 in the database where application Y2 is defined for, i.e. all the entities (data structure and relationships) belonging to application Y2 are duplicated in the database and labeled with VersionID2 (type EDITING);

e) The changes to the configuration of data structures in application Y2 are stored persistently in the database in the records corresponding to the EDITING version;
f) All the entities contained within application Y2 with version set to EDITING version are browsed in the database;
g) All the entities belonging to applications different from Y1 and Y2 with VersionID set to CURRENT are browsed into the database;
h) The system performs the following operations:
  i) disconnect all the clients (if any) that are connected to the data structures of application Y1:
    i1) if the disconnection fails, the session is not closed; the version remains in EDITING status, the CURRENT version is not changed in any way and the user is advised (by a suitable error) that he can try again and will succeed in closing it as soon as the connection is repaired;
    i2) otherwise, the EDITING version is exported to the CURRENT version in transactional way; if the export succeeds (if no error occurs), the physical database structure is updated to the structure defined in the EDITING version, the .clb files are updated, all the entities belonging to application Y1 with VersionID set to CURRENT are removed from the database and all the entities belonging to application Y1 with VersionID set to EDITING are toggled into CURRENT. The editing session is closed and clients can reconnect again.
  ii) Otherwise, if any of the operations listed under i2) fail, the entire step i2) is rolled back; the session is not closed, the version remains in EDITING status, the CURRENT version is not changed in any way and the user is advised that one of the following two options will happen:
    ii1) A recoverable error, such as a network failure, in which case the user can try again and will succeed in saving the EDITING version as soon as the connection is repaired;
    ii2) An recoverable error, which can happen, for example, if some constraints contained in the EDITING version can not be any more applied to the data structures inserted by any client while the session was opened; in this case the user won't succeed in saving the EDITING version unless he changes, either the data or some EDITING version change (to assist user in that, the editing change that caused the error will be shown, to help user in identifying and correct it).
i) The CURRENT version is browsed; all the entities belonging to any application with VersionID set to CURRENT are browsed in the database;
j) Same as for d) but for another application, different from Y2 and Y1, say Y3;
k) Same as for e) but for application Y3;
l) Same as for f) but for application Y3;
m) Same as for h) but for application Y3 or same as for i) but for application Y3.

User Interface

As soon as the connection to the database is established (by means of the same wizard as in the previous section), all the custom structures defined for each database will be shown, grouped in custom application. At this point the user interface will be modified, for the different cases in the way described hereinafter:

1) Opening an Editing Session

The main difference will be that the user is not allowed to perform any change to the data structures until he actually opens an editing session; that is, the COC will be in read-only mode if an editing session is not opened. In order to open an editing session, new commands will be provide in the contextual menu (see FIG. 1), that will be enabled when on of the two subnodes (runtime or engineering) has been selected for a given application. Please note that, since the editing session can only be opened for a given application, it is not possible to open an editing session when the entire application is selected and not one of its subnodes. The user will be requested to choose between two types of editing session: Locked or Unlocked.

The main differences between these two modes are as now described.

The Locked session provides the user exclusive access to the structures he is going to modify and, therefore, grants always the possibility to commit changes done at the end of the session itself. Otherwise, clients connected to some structure that has been changed during the session could have stored records in conflict with the updates that preventing the session from being committed. Therefore, this kind of session can only be opened if there are no clients connected to the same application: if such mode is chosen, and there are connected clients, the user is prompted with a dialog box like the one shown in FIG. 2, for choosing if disconnect all the clients, in order to open the session, or abort the request.

The Unlocked session allows performing long-time editing sessions, without any need to disconnect the clients from the same application. It can be used every time the user is able to grant that the records stored or updated during the editing session will not generate any conflict with the changes done for the structure. In fact, if conflicts arise while committing the changes after the session has been closed with a SAVE parameter, the session can not be saved until the user does on of the following:
a) Remove the data creating the conflict from the database (for example records with the same value in a field that has been chosen as a primary key in the editing session; and
b) Remove the changes done in the editing session that are conflicting with the data structure (for example remove the primary key);
c) Quits the editing session.

Not that, in this first release of the Unlocked editing session, the COO is not yet able to provide hints to the user about conflicts that are preventing from saving the editing session, except for SQL errors traced in the CDK log file. Therefore, the unlocked session is mainly provided for testing purposes when the user has not any mandatory need to commit the changes actually done.

Figure 3:
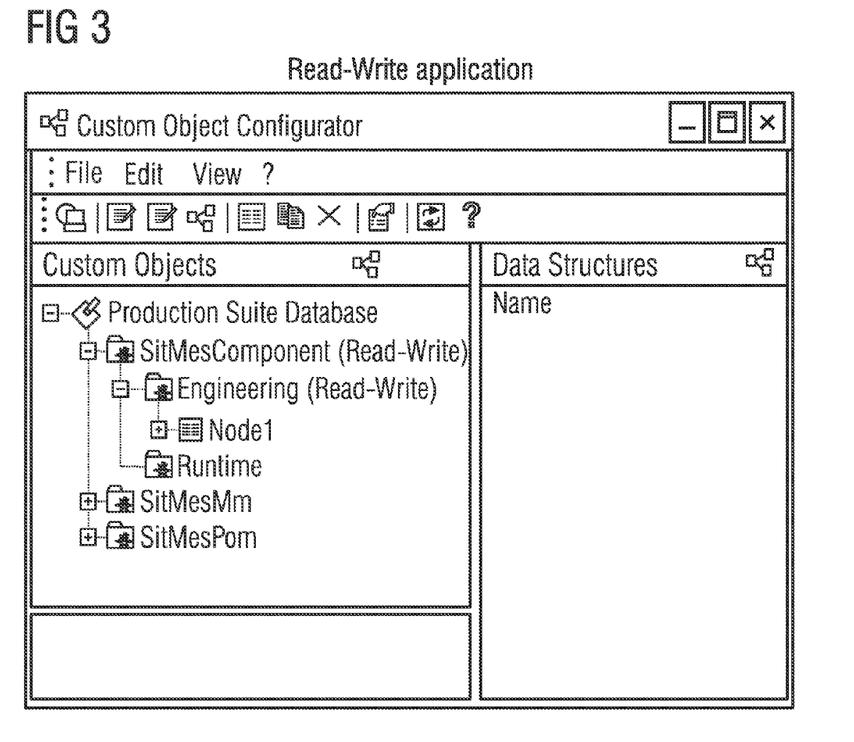
FIG. 3 is a screen-shot schematically showing a window for a read-write application.

Once an editing session is opened for a given application, the editing commands in the contextual menu are enabled. The user is notified of the application in editing mode by use of a suitable flag (Read-Write) that will be appended to the application node in the left-hand tree control (see FIG. 3: Read-Write application).

2) New Relationships Management

In order to provide inside an editing session the possibility to define a relationship between custom structures, the following statement has to be considered when the two structures are part of different applications: the relationship has to be edited by opening a session on the application where the structure with the foreign key is located. In order to clarify this for the user, the visualization of relationships in the COC will change as follows: the dedicated pane for relationship visualization will be dropped.

Figure 4:
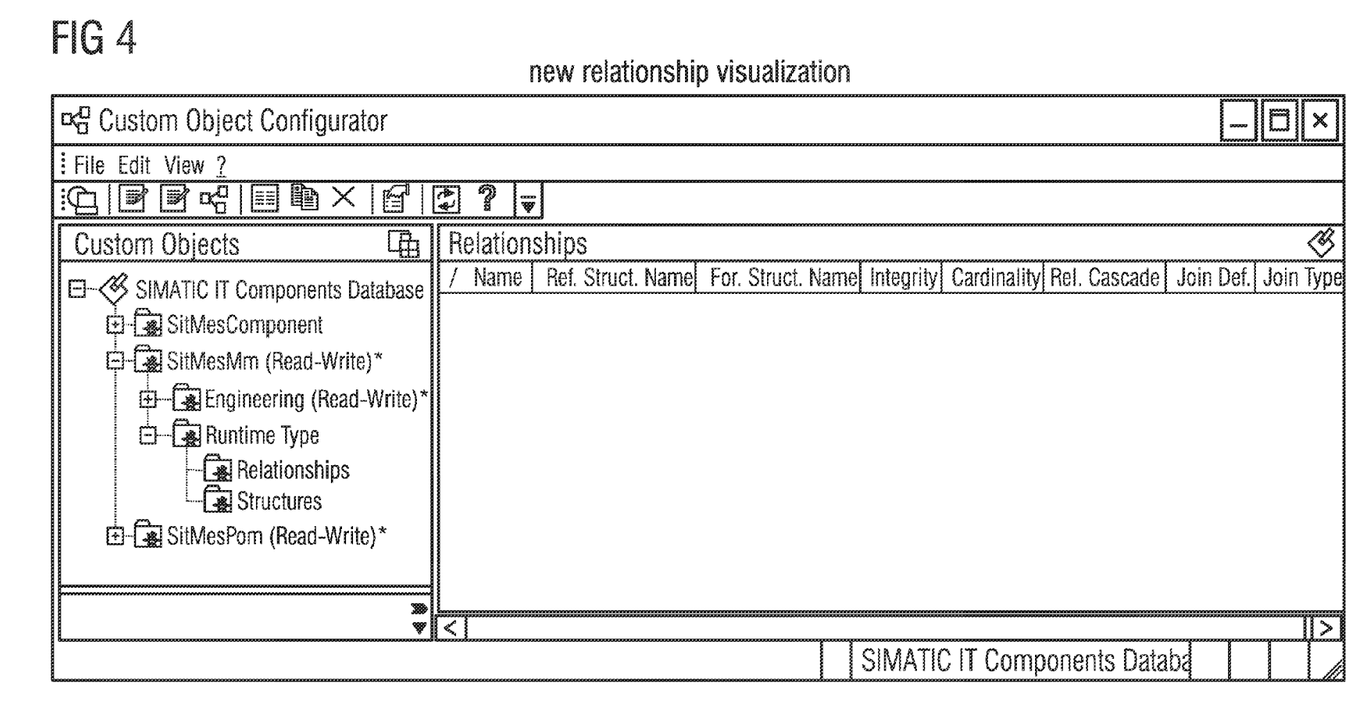
FIG. 4 is a screen-shot schematically showing a window for a visualization of new data relationships/structures.

In the left hand tree of the COC under the node corresponding to an application, two new nodes, structures and relationships will be shown (see FIG. 4).

Figure 5:
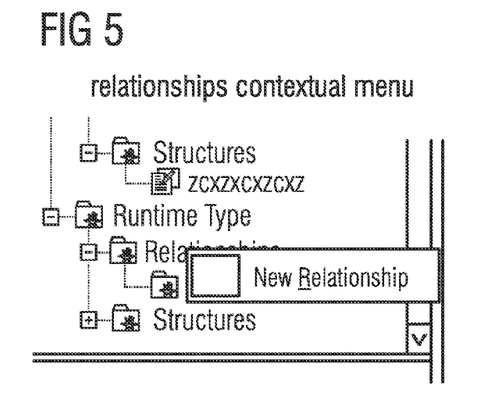
FIG. 5 is a screen-shot schematically showing a window of the relationship contextual menu.
Figure 6:
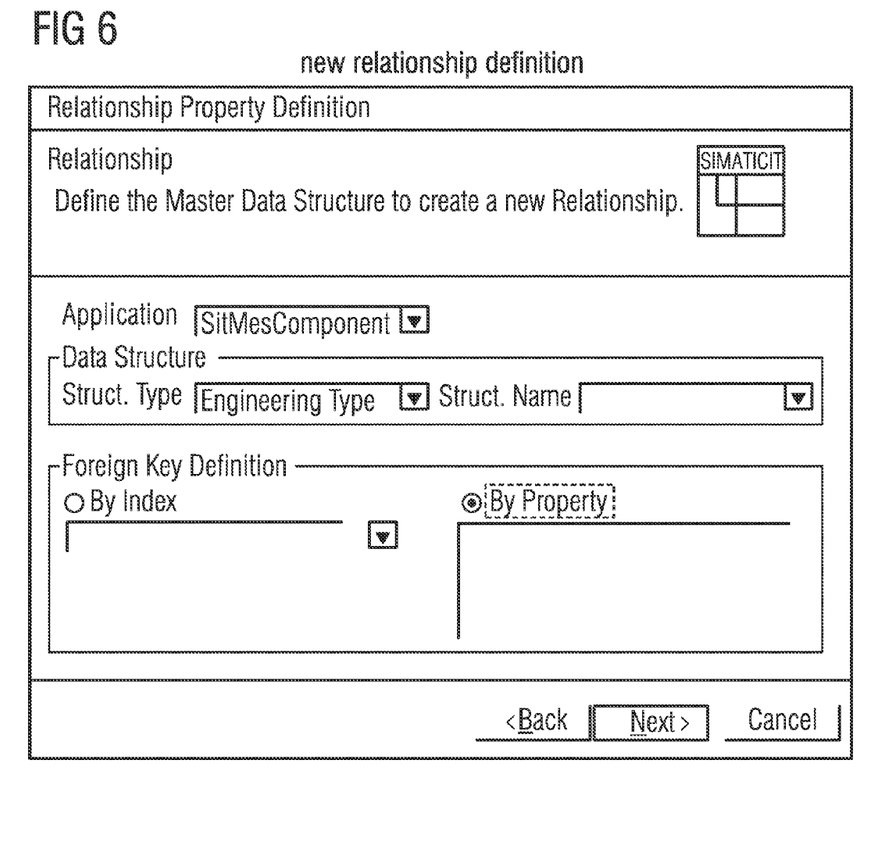
FIG. 6 is a screen-shot schematically showing a window for the definition of new relationships/structures.
Figure 7:
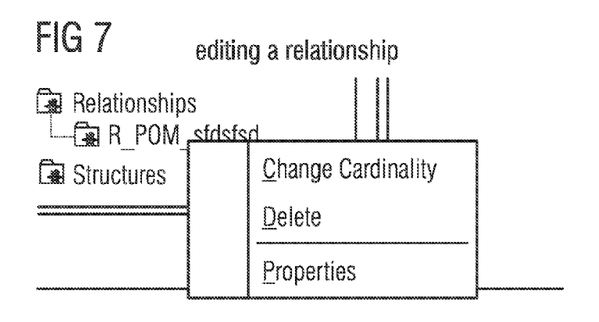
FIG. 7 is a screen-shot schematically showing a window for editing a relationship.

For defining a new relationship, a contextual menu will be provided by right clicking the menu on the relationship node (see FIG. 5); for editing an already defined relationship, it is necessary to select it in the left hand tree and right click in order to visualize the contextual menu shown in FIG. 7.

3) Closing the Editing Session

Figure 8:
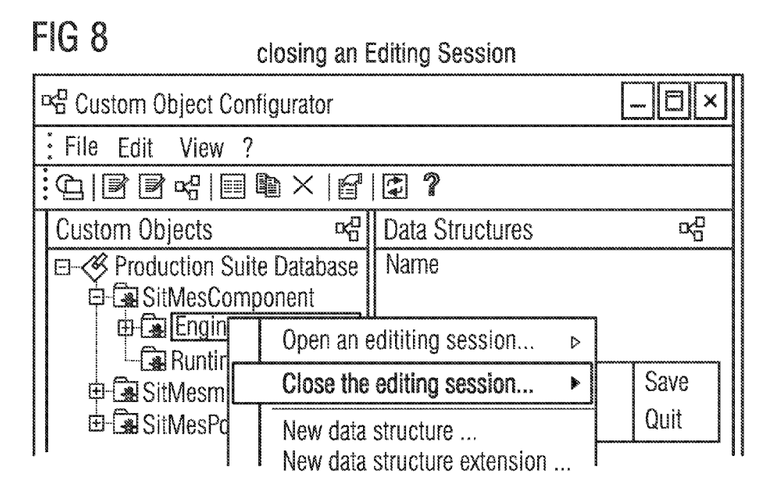
FIG. 8 is a screen-shot schematically showing a window for closing an editing session.

In order to commit all the changes done during an editing session, the user has only the possibility to give a Close Editing Session command which is also provided by contextual menu. Please note that the previous command SAVE will disappear from the toolbar and from the COC on general. When such command is invoked (see FIG. 8: closing an Editing session) the user is prompted for choosing between two options: SAVE or QUIT.

Figure 2:
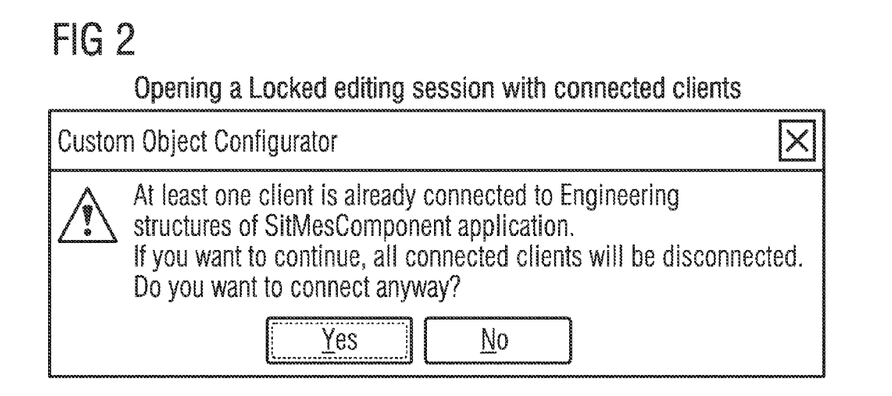
FIG. 2 is a screen-shot schematically showing an opening window for a locked editing session.
Figure 9:
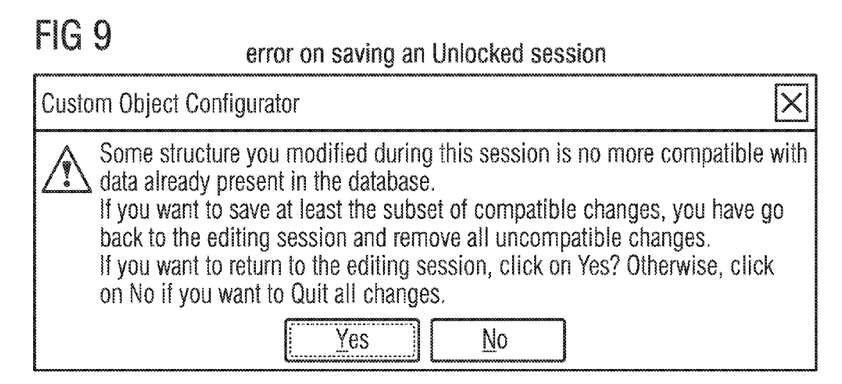
FIG. 9 is a screen-shot schematically showing an error message on saving the changes of an unlocked editing session.

If the option SAVE is chosen for an Unlocked session the clients connected to the application for which the editing session was opened will be disconnected and the user is prompted for confirming this action by the same dialog box shown in FIG. 2. As mentioned before, in this case it may happen that some change done during the editing session (for example the insertion of uniqueness constrain) cannot be applied to the physical database due to conflicts with data stored in the table during the editing session by any of the connected clients. In this case, the dialog shown in FIG. 9 is displayed.

Note that this problem cannot happen if the editing session has been locked in Locked mode thanks to the checks done by the system when each modification is done and to the absence of connected clients.

If the option QUIT is chosen, the changes done during the Editing session are discarded, the application turns back in read-only mode and, for Locked session, clients can reconnect again. Note that, of the session was opened in Unlocked mode, clients do not receive any PPA_LIBOLDVERSION or COGSI_DIALIGNED_STRUCTURE error if the session is quit.

4) CO Editing Session with Suspend Parameter

When an Editing is closed without saving or quitting, the configuration data stored in the Editing session are left unchanged; they are not exported in the clb in order to become the CURRENT version nor removed from the database as when the version is quit.

Figure 10:
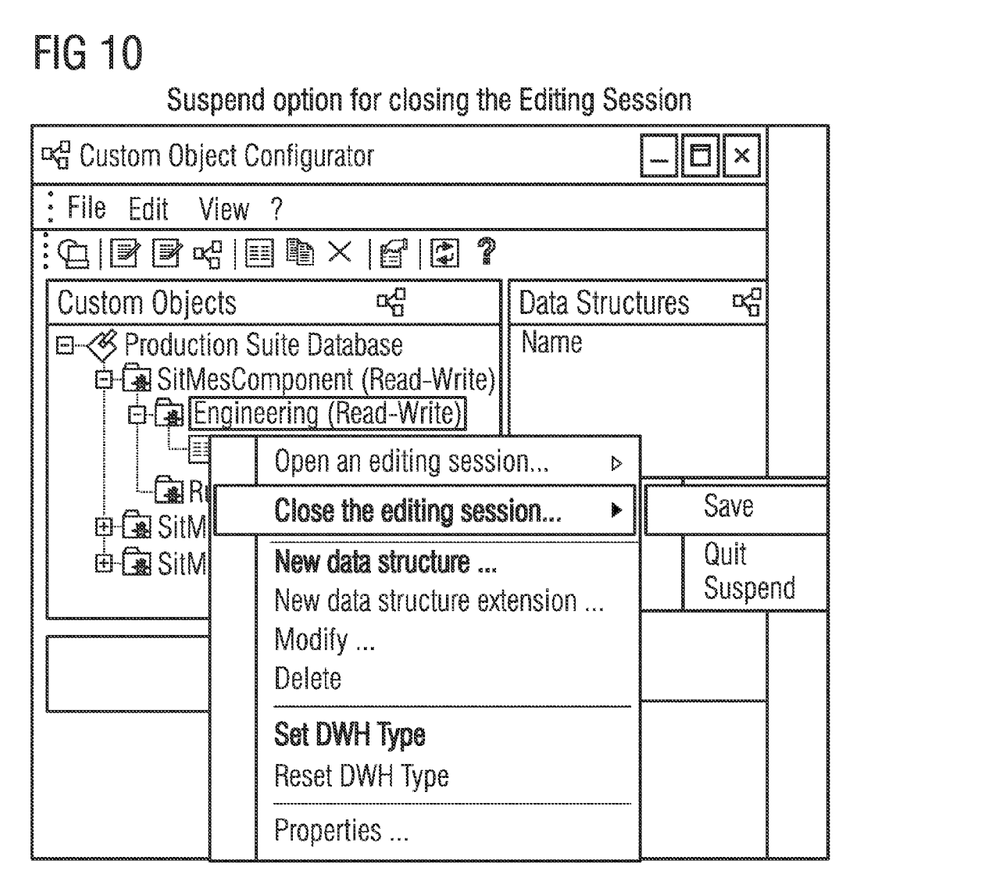
FIG. 10 is a screen-shot schematically showing a suspend option for closing an editing session.

As soon as the new editing session is opened for a given application, the system checks if an EDITING version already exists. Since it is not allowed by the system to have more than one EDITING version for each application, in this case, the user is requested to select between two options: to reopen the suspended version in order to save it or to discard it. Note that if the second option is chosen, the EDITING version is overwritten with a new one from scratch and the changes done during the previous session are lost forever. The COO Close Editing Session contextual menu (see FIG. 10), that is enabled by right clicking on an Application in Read-Write mode, will show a third option SUSPEND in addition to the SAVE and QUIT option.

Figure 11:
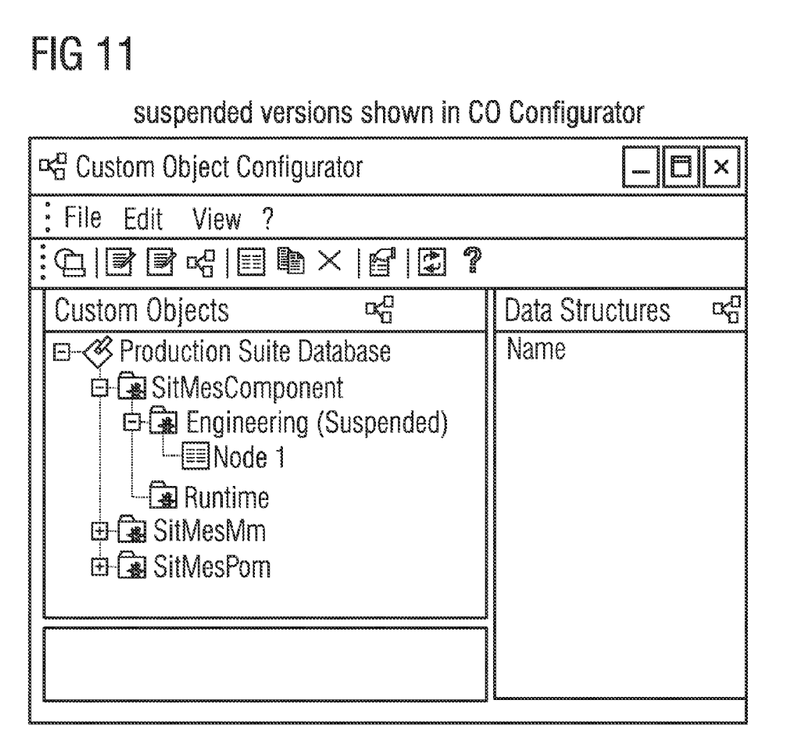
FIG. 11 is a screen-shot schematically showing a suspended editing session in the custom object configurator.
Figure 12:
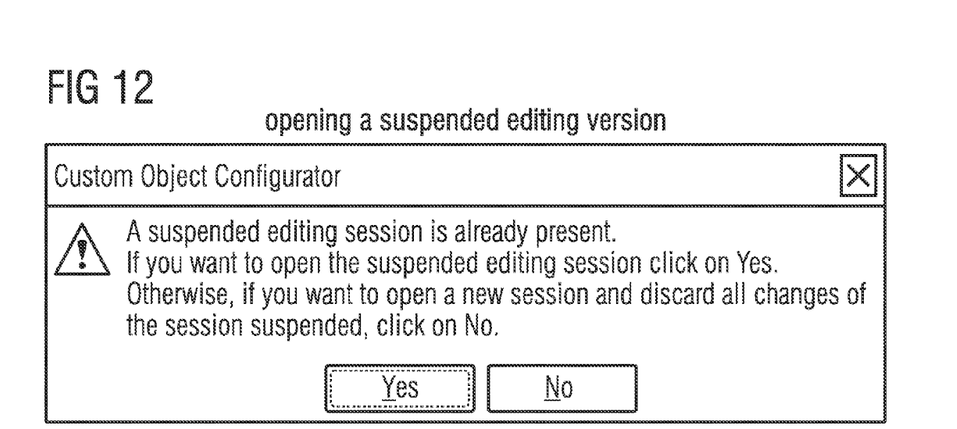
FIG. 12 is a screen-shot schematically showing the opening of a suspended editing session.

The applications for which an Editing session has been suspended will be shown in the COO as in FIG. 11. FIG. 12 illustrates the contextual menu for reopening a suspended Editing session.

The invention claimed is:

1. A computer implemented method for safeguarding integrity of a relational database in case of structural transaction execution in object relational mapping saving, the method comprising:
    on a computer, starting an editing session on an application, the editing session copying a data structure of the application and labeling an original version of the data structure as a current version used and labeling a copied version of the data structure as an editing version, the application being for a structural database transaction to be executed, the application including a set of data structures;
    during the editing session on the computer, editing any change to the data structure in the editing version of the data structure;
    closing the editing session on the computer by saving the editing version of the data structure to the relational database;
    during the saving of the editing version on the computer, installing the editing version of the data structure to the relational database thereby removing the original version of the data structure from the relational database and removing the labeling of a former editing version;
    on the computer, starting a second editing session on the application, the second editing session copying a second data structure of the application and labeling an original version of the second data structure as a current version used and labeling a copied version of the second data structure as an editing version;
    during the second editing session on the computer, editing any change to the second data structure in the editing version of the second data structure;
    closing the second editing session on the computer by discarding the editing version of the data structure; and
    during the discarding of the editing version, deleting the editing version and removing the labeling of the original version of the data structure.

2. The method according to claim 1, which further comprises executing the editing session either in a locked mode or an unlocked mode wherein the locked mode does allow any read-action but does not allow any write-action on the application for which the editing session is open, and the unlocked mode allows any read-action and write-action on the application for which the editing session is open.

3. The method according to claim 1, which further comprises during the editing session, checking any change when modifications are issued against data structure inconsistencies, including uniqueness of data structure keys.

4. The method according to claim 1, wherein for the saving of the editing version to the relational database, any user connected to the data structure of the application is disconnected prior to an installation of the editing version to the relational database.

5. The method according to claim 2, wherein in a case of the editing session in the unlocked mode, changes made to the data structure of the application during the editing session are discarded in case of an inconsistency with the data structure of the current version.

6. The method according to claim 1, which further comprises:
    on the computer, starting a third editing session on the application, the third editing session copying a third data structure of the application and labeling an original version of the third data structure as a current version used and labeling a copied version of the third data structure as an editing version;
    during the third editing session on the computer, editing any change to the third data structure in the editing version of the third data structure;
    closing the third editing session on the computer by suspending the editing version of the data structure; and
    during the suspending of the editing version, storing the editing version temporarily, keeping the original version of the data structure, and removing the labeling of the original version of the data structure.

7. A computer implemented method for safeguarding integrity of a relational database in case of structural transaction execution in object relational mapping saving, the method comprising:
- on a computer, starting an editing session on an application, the editing session copying a data structure of the application and labeling an original version of the data structure as a current version used and labeling a copied version of the data structure as an editing version, the application being for a structural database transaction to be executed, the application including a set of data structures;
- during the editing session on the computer, editing any change to the data structure in the editing version of the data structure;
- closing the editing session on the computer by saving the editing version of the data structure to the relational database;
- during the saving of the editing version on the computer, installing the editing version of the data structure to the relational database thereby removing the original version of the data structure from the relational database and removing the labeling of a former editing version;
- on the computer, starting a second editing session on the application, the second editing session copying a second data structure of the application and labeling an original version of the second data structure as a current version used and labeling a copied version of the second data structure as an editing version;
- during the second editing session on the computer, editing any change to the second data structure in the editing version of the second data structure;
- closing the second editing session on the computer by suspending the editing version of the data structure; and
- during the suspending of the editing version, storing the editing version temporarily, keeping the original version of the data structure, and removing the labeling of the original version of the data structure.

* * * * *